June 7, 1932.   R. F. HALL   1,862,264
MACHINE FOR THE MANUFACTURE OF HOLLOW BLOWN GLASS ARTICLES
Filed Jan. 16, 1930
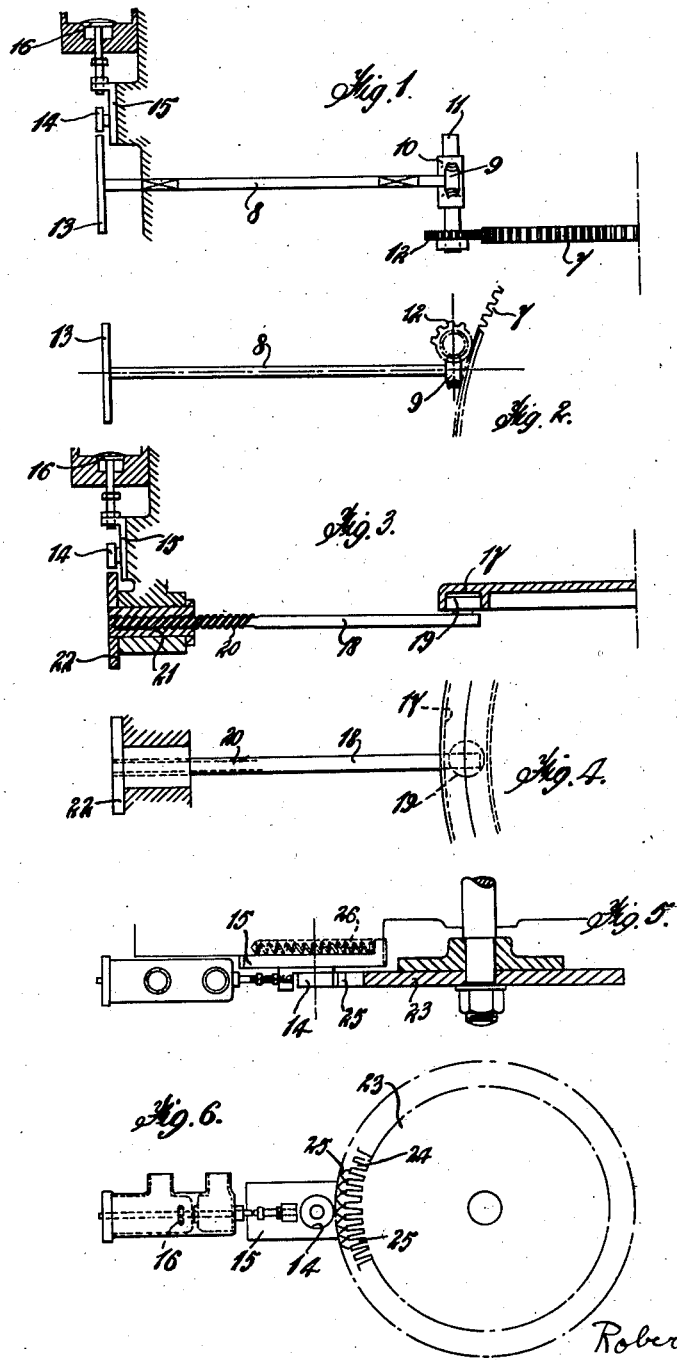
INVENTOR
Robert F. Hall
BY
Baldwin Wight
His ATTORNEYS

Patented June 7, 1932

1,862,264

UNITED STATES PATENT OFFICE

ROBERT FREDERICK HALL, OF EDGBASTON, BIRMINGHAM, ENGLAND

MACHINE FOR THE MANUFACTURE OF HOLLOW BLOWN GLASS ARTICLES

Application filed January 16, 1930, Serial No. 421,283, and in Great Britain January 28, 1929.

This invention relates to machines for the manufacture of hollow blown glass articles, such as bottles, and refers to that type of such machines in which a plurality of units is provided—a unit being a set of associated mechanisms adapted to make a predetermined complete hollow glass article, such as a bottle.

Although not exclusively limited to such machines, the invention is particularly suitable for such machines wherein the units are adapted to move in a fixed path, preferably in a circular path, with respect to a fixed element, such as a central column or stationary framework of the machine.

The invention refers more particularly to means for regulating and controlling the supply of blowing air to the articles in the course of manufacture.

Hitherto, in machines of the above type, the usual practice has been to provide a fixed cam on the central column or equivalent part of the machine, and to operate the blowing valve in each unit from such cam. This system of construction renders it difficult simultaneously to blow different articles on the different units of a machine, and necessitates the stoppage of production during the setting and adjustment of the cam.

According to the invention, each unit carries its own individual cam for operating the blowing valve of the particular unit, and motion is imparted to the cam or controlled by the relative movement of the unit with respect to the fixed column, thus enabling the periods and nature of the blowing to be varied in each unit, to suit the article being manufactured by the unit.

The cam may be of any form and may be adapted to be interchanged for another form of cam to suit requirements, or the cam itself may be made adjustable, or the parts forming the contour may be built up so as to give any required blowing periods.

The cam of each of the units may be operated by means of the main cam on the fixed element imparting movement to follower mechanism, which in turn imparts movement to the cam of the unit, or the movement of the cam of each unit may be obtained through gearing operated by the relative movement of each unit with respect to the fixed element.

In order that the invention may be clearly understood, it will now be described as applied to a rotary machine for the manufacture of hollow blown glass articles, such as bottles, with reference to the accompanying diagrammatic drawing, in which:—

Fig. 1 shows a fragmentary elevation of one mechanism for carrying the invention into effect.

Fig. 2 shows a plan of a portion of Fig. 1.

Figs. 3 and 4 show similar views to Figs. 1 and 2, but of another mechanism for carrying the invention into effect.

Fig. 5 shows a sectional elevation, and

Fig. 6 an under plan, of a built-up cam and associated blowing valve.

Referring to Figs. 1 and 2, 7 is a large gear wheel, a portion only of which is shown, which large gear wheel is attached to a suitable portion of the central column (not shown). The unit rotating around the fixed column comprises a shaft 8 mounted in suitable bearings (not shown) and carrying at one end a worm wheel 9 meshing with a worm 10 carried by a shaft 11 upon which is mounted a pinion 12 meshing with the fixed large gear wheel 7. The other end of the shaft 5 carries a cam 13 of any suitable form working in conjunction with a roller 14 mounted upon a slide 15, the movements of which control the opening and closing of the blowing valve 16.

In the form of the invention shown in Figs. 3 and 4, the fixed gear 7 is replaced by a fixed cam 17 and the unit comprises a sliding rod 18 having a roller 19 co-operating with the cam 17. The rod 18 has a multiple start screw 20 of a suitable coarse pitch at its free end, and this works in a correspondingly threaded sleeve 21 carrying the cam 22. The sleeve 21 is held from longitudinal movement but is mounted to rotate and consequently the cam 17 effects the rotation of the cam 22. By furnishing the sleeve 21 with a suitable ratchet or other free wheel mechanism, in its connection with the cam 22, the return movement of the rod 18 does not rotate the cam.

The movements of the cam 22 cause the opening and closing of the valve 16, according to the nature of the cam which is designed, adjusted or built-up, according to the article being manufactured by the particular unit.

Figs. 5 and 6 show one form of cam to be carried by each unit, adapted to be built-up to give blowing periods at required positions during the rotation of the said cam. The cam comprises a body or frame 23 having somewhat radial grooves 24 on the periphery. These radial grooves are adapted to receive cam pieces 25 of suitable shape which project beyond the periphery of the body or frame 23 a desired radial distance.

Any suitable means may be provided for retaining the cam pieces 25 in position, for example they may be provided with flat strip springs to come on each flat face of the body or frame 23 and engage recesses in the said body or frame.

In the drawing, the valve 16 (Figs. 5 and 6) is shown in the open position, by reason of the fact that the cam pieces 25 have come into contact with the roller 14 and moved the slide 15 against the action of the spring 26, the movement of the slide being communicated through suitable tappet mechanism to the valve 16.

It should be understood that cam pieces such as 25 are inserted into the periphery of the body or frame 23 at any circumferential position where it is desired the valve 16 shall be open. If it is required to open the valve for a short period, such as to give a preliminary puff, or for a sustained blowing period of suitable duration, without alteration of the blowing pressure, cam pieces will be utilized side by side of suitable shape. Where it is desired to keep the valve open for the full blowing of the finished article, a desired number of cam pieces are mounted in successive positions. Cam pieces such as 25 having projecting portions of varying radial extent may also be employed where required.

A great advantage of the construction and arrangement is that the cam pieces such as 25 can be altered as to circumferential position, or interchanged or radially adjusted, during the working of the machine, and that such adjustment can be readily effected by one operator and that without stopping the production of the other units, which has hitherto been impossible in machines of the type to which the invention relates.

It will be realized that other forms of built-up and adjustable cams may be employed than those shown in the drawing, and in some cases in place of adjustable or built-up cams, cams of fixed form may be employed, the form of the cam being in accordance with the nature of the article required.

By including in each unit a cam for operating the blowing valve of that unit, it is a comparatively simple and easy matter to adapt that unit for manufacturing any particular article, irrespective of the article or articles being manufactured by any of the other units of the machine.

With machines constructed according to this invention, the blowing of an article in any one unit is wholly independent of the blowing of the articles in the other units, so that it is possible simultaneously to make, without difficulty, as many different articles as there are units on the same machine.

Machines according to the invention are therefore of more universal application than machines as hitherto constructed, since a single machine may be adapted for the simultaneous construction of a wide range of articles.

Although in the particular description, rotary cams have been described, it will be understood that other descriptions of cams may be furnished.

The invention has been more particularly described with reference to machines in which only one article is made at one time in each unit, but it is of course applicable to machines in which a plurality of articles are simultaneously manufactured in each unit or in some of the units, in other words to machines with units having multiple moulds.

It is to be remarked that the method of carrying out the invention is not limited to the particular details of construction described, as many modifications as to detail may be made without departing from the scope of the invention.

What I claim and desire to secure by Letters Patent of the United States of America is:—

1. A machine for the manufacture of hollow blown glass articles, comprising a relatively fixed element, a plurality of blowing units movable in a path about the said fixed element, a blowing valve in each unit for regulating the supply of blowing air, a cam device individual to each of said units and movable with the respective units for operating the blowing valve thereof, and means for driving the said cam device synchronously with the relative movement of the unit and the fixed element for the purposes set forth.

2. A machine for the manufacture of hollow blown glass articles, comprising a central column, a plurality of blowing units movable in a circular path about the said column, a blowing valve in each unit for regulating the supply of blowing air, each of said units having an individual cam device movable with the unit for operating the blowing valve thereof, and means for driving the said cam device synchronously with the relative movement of the unit and column for the purposes set forth.

3. A machine for the manufacture of hollow blown glass articles according to claim 1 having means whereby the cams are adjustable to vary the control of said blowing valves.

4. A machine for the manufacture of hollow blown glass articles according to claim 2 having means whereby said cams are adjustable to vary the contour of the cam surfaces thereof.

5. A machine for the manufacture of hollow blown glass articles according to claim 1 wherein said fixed element has a cam means, and follower mechanism cooperating with the cam means to impart motion to the said cam devices.

6. A machine for the manufacture of hollow blown glass articles according to claim 2 wherein said central column is provided with cam means, and follower mechanism cooperating with the cam means to impart motion to the said cam devices.

7. A machine for the manufacture of hollow blown glass articles according to claim 1 wherein gearing is disposed between the fixed element and units to impart motion to the said cam devices.

8. A machine for the manufacture of hollow blown glass articles according to claim 2 wherein gearing is disposed between the column and units to impart motion to the said cam devices.

9. A machine for the manufacture of hollow blown glass articles, comprising a plurality of blowing units movable in an endless path, a blowing valve in each unit for regulating the supply of blowing air, an operating and control device individual to each of said units and movable with the respective units for operating the blowing valve thereof, and means for driving the said devices synchronously with the movement of the units.

In witness whereof I affix my signature.

ROBERT FREDERICK HALL.